US012770789B2

(12) United States Patent
Yang et al.

(10) Patent No.: US 12,770,789 B2
(45) Date of Patent: Oct. 20, 2026

(54) MULTILAYER ELECTRONIC COMPONENT

(71) Applicant: SAMSUNG ELECTRO-MECHANICS CO., LTD., Suwon-si (KR)

(72) Inventors: Chan Ho Yang, Suwon-si (KR); Seong Hyeon Cho, Suwon-si (KR); Seung Min Kang, Suwon-si (KR); Dae Hee Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 126 days.

(21) Appl. No.: 18/812,793

(22) Filed: Aug. 22, 2024

(65) Prior Publication Data

US 2025/0140477 A1 May 1, 2025

(30) Foreign Application Priority Data

Oct. 26, 2023 (KR) ........................ 10-2023-0144773

(51) Int. Cl.
*H01G 4/12* (2006.01)
*H01G 4/30* (2006.01)

(52) U.S. Cl.
CPC ............. *H01G 4/1227* (2013.01); *H01G 4/30* (2013.01)

(58) Field of Classification Search
CPC .. H01G 4/1209; H01G 4/1227; H01G 4/1236; H01G 4/1245; H01G 4/30
See application file for complete search history.

(56) References Cited

U.S. PATENT DOCUMENTS

| | | | | |
|---|---|---|---|---|
| 2016/0336114 | A1* | 11/2016 | Nishimura | H01G 4/12 |
| 2017/0323727 | A1* | 11/2017 | Mukoyama | H01G 4/248 |
| 2018/0012702 | A1* | 1/2018 | Azuma | H01G 4/248 |
| 2019/0080851 | A1* | 3/2019 | Nies | H01G 7/06 |
| 2021/0159015 | A1 | 5/2021 | Son | |
| 2023/0253157 | A1 | 8/2023 | Lee et al. | |

FOREIGN PATENT DOCUMENTS

| | | | | |
|---|---|---|---|---|
| CN | 107680807 A * | 2/2018 | | H01G 4/224 |
| JP | H08-78285 A | 3/1996 | | |
| JP | 2020-141091 A | 9/2020 | | |

OTHER PUBLICATIONS

Extended European Search Report dated Dec. 4, 2024, issued in corresponding European Patent Application No. 24196153.1.

* cited by examiner

*Primary Examiner* — Nathan Milakovich
(74) *Attorney, Agent, or Firm* — Morgan, Lewis & Bockius LLP

(57) ABSTRACT

A multilayer electronic component includes a body including a capacitance formation portion including a dielectric layer and an internal electrode alternately disposed with the dielectric layer in a first direction, and a cover portion disposed on both end surfaces of the capacitance formation portion in the first direction; and an external electrode disposed on the body. The cover portion includes a barium titanate ($BaTiO_3$)-based material as a main ingredient, and a piezoelectric ceramic material excluding the barium titanate ($BaTiO_3$)-based material as a sub-ingredient.

20 Claims, 3 Drawing Sheets

I-I'

P

MULTILAYER ELECTRONIC COMPONENT

CROSS-REFERENCE TO RELATED APPLICATION(S)

This application claims the benefit of priority to Korean Patent Application No. 10-2023-0144773 filed on Oct. 26, 2023 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of various types of electronic products such as image display devices, including a liquid crystal display (LCD) and a plasma display panel (PDP), computers, smartphones, and mobile phones, and serves to charge or discharge electricity therein or therefrom.

The multilayer ceramic capacitor may be used as a component of various electronic devices due to having a small size, ensuring high capacitance and being easily mounted. With the miniaturization and high-output power of various electronic devices such as computers and mobile devices, demand for miniaturization and implementation of high capacitance of multilayer ceramic capacitors has also been increasing.

More specifically, with an increase in demand for IT electronic devices having a smaller size and a higher degree of integration, conditions related to acoustic noise in such devices also have become more stringent. As a result, there is a need for products having improved acoustic noise properties.

When MLCCs according to the related art are continuously exposed to acoustic noise, generated when high frequencies are applied, and are operated, MLCCs may have a negative effect on adjacent circuits or devices, or may destabilize electrical signal transmissions. In addition, continuous acoustic noise generation may deform an MLCC itself, such that the MLCC may have lowered reliability and durability, which may cause noise issues for users using devices including the MLCC.

SUMMARY

An aspect of the present disclosure is to cancel acoustic noise applied to a multilayer electronic component.

Another aspect of the present disclosure is to cancel acoustic noise applied to a cover portion.

Another aspect of the present disclosure is to improve reliability and a lifespan of a multilayer electronic component.

However, the aspects of the present disclosure are not limited to those set forth herein, and will be more easily understood in the course of describing specific example embodiments of the present disclosure.

A multilayer electronic component may include a body including a capacitance formation portion including a dielectric layer and an internal electrode alternately disposed with the dielectric layer in a first direction, and a cover portion disposed on both end surfaces of the capacitance formation portion in the first direction; and an external electrode disposed on the body. The cover portion may include a barium titanate ($BaTiO3$)-based material as a main ingredient, and a piezoelectric ceramic material excluding the barium titanate ($BaTiO3$)-based material as a sub-ingredient.

According to example embodiments of the present disclosure, acoustic noise of a multilayer electronic component may be cancelled.

According to example embodiments of the present disclosure, acoustic noise of a cover portion may be cancelled.

According to example embodiments of the present disclosure, a multilayer electronic component may have improved reliability and an improved lifespan.

However, the various and beneficial advantages and effects of the present disclosure are not restricted to those set forth herein, and will be more easily understood in the process of describing specific example embodiments.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
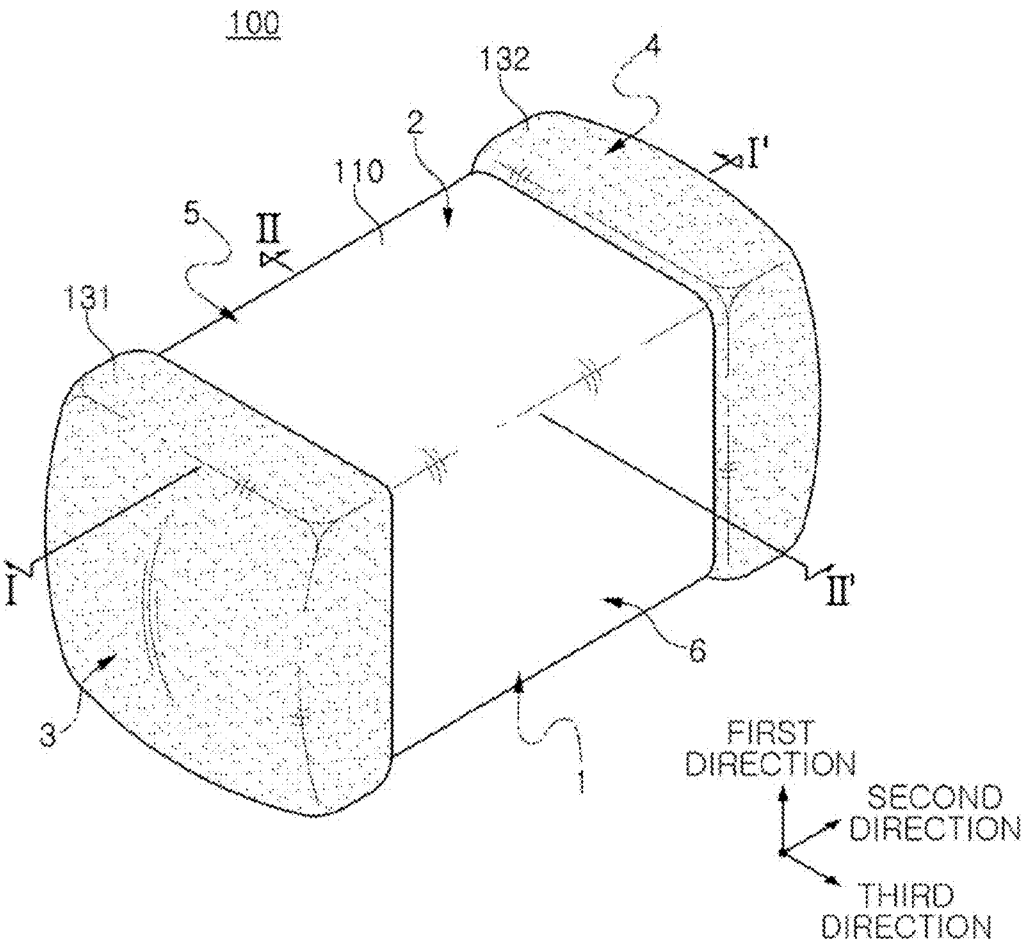
FIG. 1 is a schematic perspective view of a multilayer electronic component according to an example embodiment of the present inventive concept.

Hereinafter, example embodiments of the present disclosure are described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is referred to as "comprising" or "including," it means that it may include other elements as well, rather than excluding other elements, unless specifically stated otherwise.

In the drawings, a first direction may be defined as a lamination direction or a thickness (T) direction, a second direction may be defined as a length (L) direction, and a third direction may be defined as a width (W) direction.

Multilayer Electronic Component

FIG. 1 is a schematic perspective view of a multilayer electronic component according to an example embodiment of the present inventive concept.

Figure 2:
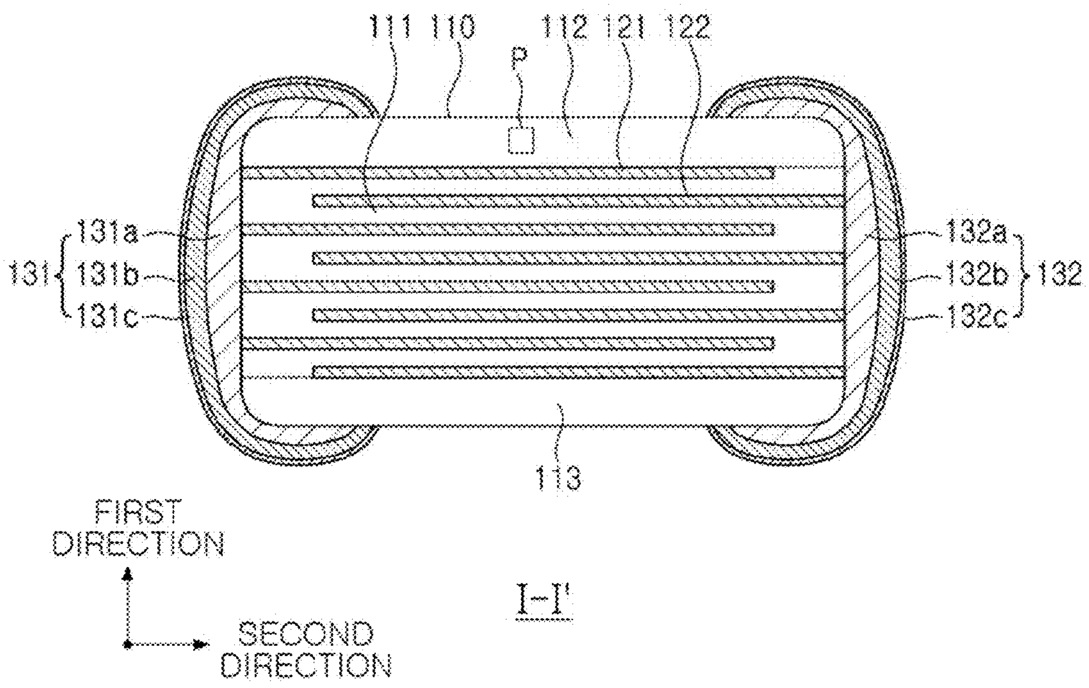
FIG. 2 is a schematic cross-sectional view taken along line I-I' of FIG. 1.

FIG. 2 is a schematic cross-sectional view taken along line I-I' of FIG. 1.

Figure 3:
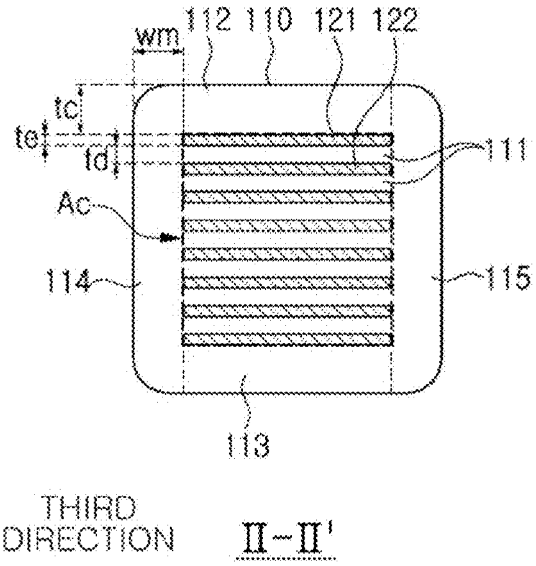
FIG. 3 is a schematic cross-sectional view taken along line II-II' of FIG. 1.

FIG. 3 is a schematic cross-sectional view taken along line II-II' of FIG. 1.

Figure 4:
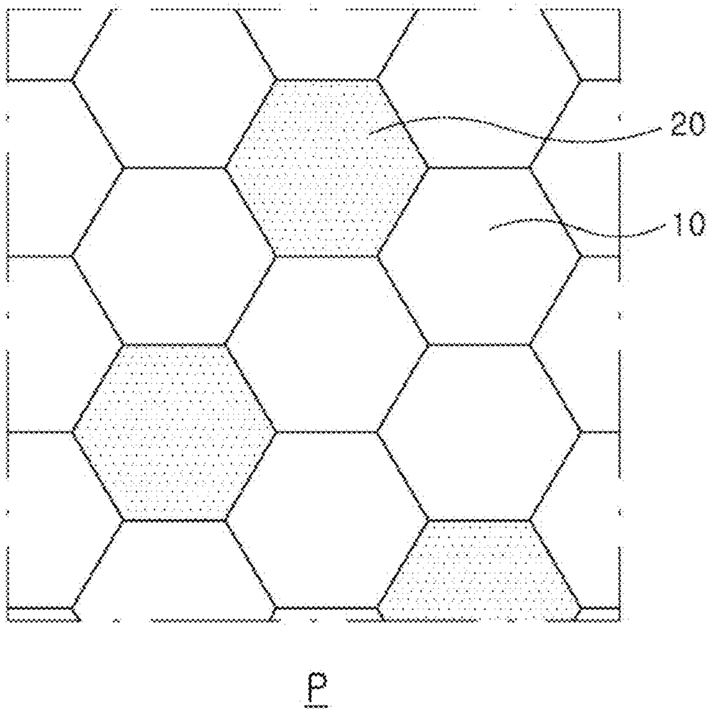
FIG. 4 illustrates a schematic microstructure of an enlarged view of region P of FIG. 2.

FIG. 4 illustrates a schematic microstructure of an enlarged view of region P of FIG. 2.

Hereinafter, a multilayer electronic component according to an example embodiment of the present disclosure will be described in detail with reference to FIGS. 1 to 4. A multilayer ceramic capacitor is described as an example of a multilayer electronic component. However, the present disclosure may be applied to various electronic products using a dielectric composition, such as inductors, piezoelectric elements, varistors, thermistors, or the like.

A multilayer electronic component 100 according to an example embodiment of the present disclosure may include a body 110 including a capacitance formation portion Ac including a dielectric layer 111 and internal electrodes 121 and 122 alternately disposed with the dielectric layer 111 in a first direction, and cover portions 112 and 113 disposed on both end surfaces of the capacitance formation portion Ac in the first direction, and external electrodes 131 and 132 disposed on the body 110. The cover portions 112 and 113 may include a barium titanate ($BaTiO_3$)-based material as a main ingredient, and a piezoelectric ceramic material excluding the barium titanate ($BaTiO_3$)-based material as a sub-ingredient.

In the body 110, the dielectric layer 111 and the internal electrodes 121 and 122 may be alternately laminated.

More specifically, the body 110 may include a capacitance formation portion Ac disposed in the body 110, the capacitance formation portion Ac including a first internal electrode 121 and a second internal electrode 122, with the dielectric layer 111 interposed therebetween, to form capacitance.

A specific shape of the body 110 is not particularly limited. However, as illustrated, the body 110 may have a hexahedral shape or a shape similar thereto. During a sintering process, ceramic powder particles included in the body 110 may shrink, such that the body 110 may not have a hexahedral shape having perfectly straight lines, but may have a substantially hexahedral shape.

The body 110 may have first and second surfaces 1 and 2 opposing each other in the first direction, third and fourth surfaces 3 and 4 connected to the first and second surfaces 1 and 2, the third and fourth surfaces 3 and 4 opposing each other in a second direction, and fifth and sixth surfaces 5 and 6 connected to the first to fourth surfaces 1, 2, 3, and 4, the fifth and sixth surfaces 5 and 6 opposing each other in a third direction.

A plurality of dielectric layers 111, included in the body 110, may be in a sintered state, and adjacent dielectric layers 111 may be integrated with each other such that boundaries therebetween are not readily apparent without using a scanning electron microscope (SEM).

A raw material, included in the dielectric layer 111, is not limited as long as sufficient capacitance is obtainable therewith. In general, a perovskite ($ABO_3$)-based material may be used. For example, a barium titanate-based material, a lead composite perovskite-based material, or a strontium titanate-based material may be used. The barium titanate-based material may include $BaTiO_3$-based ceramic powder particles. Examples of the ceramic powder particles may include $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, or $Ba(Ti_{1-y}Zr_y)O_3$ $(0<y<1)$ obtained by partially dissolving Ca or Zr in $BaTiO_3$.

In addition, the raw material, included in the dielectric layer 111, may be obtained by adding various ceramic additives, organic solvents, binders, dispersants, and the like to powder particles such as barium titanate ($BaTiO_3$), depending on the purpose of the present disclosure.

However, the dielectric layer 111, included in the capacitance formation portion Ac, may not include a piezoelectric ceramic material excluding a barium titanate ($BaTiO_3$)-based material to be described below, or may not include a dielectric grain including a piezoelectric ceramic material formed by sintering the piezoelectric ceramic material.

Here, the capacitance formation portion Ac not including the piezoelectric ceramic material may mean that the piezoelectric ceramic material is not added to a dielectric slurry that becomes a ceramic sheet of the dielectric layer 111. During the sintering process, the piezoelectric ceramic material may diffuse from a dielectric sheet for a cover portion that becomes the cover portions 112 and 113 toward a central portion of the capacitance formation portion Ac, such that the piezoelectric ceramic material may be detected in a region of the capacitance formation portion Ac in the vicinity of an interface between the capacitance formation portion Ac and the cover portions 112 and 113, which may be due to diffusion of the piezoelectric ceramic material from the dielectric sheet for a cover portion.

Here, the region of the capacitance formation portion Ac in the vicinity of the interface between the capacitance formation portion Ac and the cover portions 112 and 113 may refer to, for example, a region of the capacitance formation portion Ac that is within 10 μm of the interface between the capacitance formation portion Ac and the cover portions 112 and 113 toward the central portion of the capacitance formation portion Ac. That is, the piezoelectric ceramic material may be included in a region of the capacitance formation portion Ac that is within 10 μm of an interface between the capacitance formation portion Ac and each of the cover portions 112 and 113 toward the central portion of the capacitance formation portion Ac, and an atomic percentage (at %) of the piezoelectric ceramic material in the region may be 5 at % or less, or the number of dielectric grains including the piezoelectric ceramic material in the region may have a percentage of 5% or less.

However, a region of the capacitance formation portion Ac other than the interface between the capacitance formation portion Ac and the cover portions 112 and 113, for example, a region of the capacitance formation portion Ac that is not within 10 μm of the interface between the capacitance formation portion Ac and the cover portions 112 and 113 toward the central portion of the formation portion Ac may not include a piezoelectric ceramic material, or may not include a dielectric grain including a piezoelectric ceramic material.

In addition, the above description may be equally applied, even when the multilayer electronic component 100 includes side margin portions 114 and 115.

That is, a piezoelectric ceramic material may be detected in a region of the capacitance formation portion Ac in the vicinity of an interface between the capacitance formation portion Ac and the side margin portions 114 and 115, which may be due to diffusion of the piezoelectric ceramic material from a dielectric sheet for a side margin portion.

The region of the capacitance formation portion Ac in the vicinity of the interface between the capacitance formation portion Ac and the side margin portions 114 and 115 may refer to, for example, a region of the capacitance formation portion Ac that is within 10 μm of the interface between the capacitance formation portion Ac and the side margin portions 114 and 115 toward the central portion of the capacitance formation portion Ac. That is, the piezoelectric ceramic material may be included in a region of the capacitance formation portion Ac that is within 10 μm of an interface between the capacitance formation portion Ac and each of the side margin portions 114 and 115 toward the central portion of the capacitance formation portion Ac, and an atomic percentage (at %) of the piezoelectric ceramic material in the region may be 5 at % or less, or the number of dielectric grains including the piezoelectric ceramic material in the region may have a percentage of 5% or less.

However, a region of the capacitance formation portion Ac other than the interface between the capacitance formation portion Ac and the side margin portions 114 and 115, for example, a region of the capacitance formation portion Ac that is not within 10 μm of the interface between the capacitance formation portion Ac and the side margin portions 114 and 115 toward the central portion of the formation portion Ac may not include a piezoelectric ceramic material, or may not include a dielectric grain including a piezoelectric ceramic material.

A thickness (td) of the dielectric layer 111 is not particularly limited.

In order to achieve high capacitance of a multilayer electronic component, a thickness of the dielectric layer 111 may be 3.0 μm or less. In order to more easily achieve high capacitance and miniaturization of the multilayer electronic component, the thickness of the dielectric layer 111 may be 1.0 μm or less, preferably 0.6 μm or less, and more preferably 0.4 μm or less.

Here, the thickness (td) of the dielectric layer 111 may refer to a thickness (td) of the dielectric layer 111 disposed between the internal electrodes 121 and 122.

The thickness (td) of the dielectric layer 111 may refer to a size of the dielectric layer 111 in the first direction. In addition, the thickness (td) of the dielectric layer 111 may refer to an average thickness (td) of the dielectric layer 111, and may refer to an average size of the dielectric layer 111 in the first direction.

The average size of the dielectric layer 111 in the first direction may be measured by scanning, with an SEM, an image of a cross-section of the body 110 in the first and second directions at a magnification of, e.g., 10,000. More specifically, an average size of one dielectric layer 111 in the first direction may refer to an average value of sizes of the one dielectric layer 111 in the first direction, measured at thirty points (without changing magnification), equally spaced apart from each other in the second direction, in the scanned image. The thirty equally spaced points may be designated in the capacitance formation portion Ac. In addition, when such average value measurement is performed on ten dielectric layers 111, the average size of the dielectric layer 111 in the first direction may be further generalized.

The internal electrodes 121 and 122 may be disposed alternately with the dielectric layer 111.

The internal electrodes 121 and 122 may include a first internal electrode 121 and a second internal electrode 122, and the first and second internal electrodes 121 and 122 may be alternately disposed to oppose each other with the dielectric layer 111 included in the body 110 interposed therebetween, and may be exposed through the third and fourth surfaces 3 and 4 of the body 110, respectively.

More specifically, the first internal electrode 121 may be spaced apart from the fourth surface 4, and may be exposed through the third surface 3, and the second internal electrode 122 may be spaced apart from the third surface 3, and may be exposed through the fourth surface 4. A first external electrode 131 may be disposed on the third surface 3 of the body 110 to be connected to the first internal electrode 121, and a second external electrode 132 may be disposed on the fourth surface 4 of the body 110 to be connected to the second internal electrode 122.

That is, the first internal electrode 121 may not be connected to the second external electrode 132 and may be connected to the first external electrode 131, and the second internal electrode 122 may not be connected to the first external electrode 131 and may be connected to the second external electrode 132. In this case, the first and second internal electrodes 121 and 122 may be electrically isolated from each other by the dielectric layer 111 interposed therebetween.

The body 110 may be formed by alternately stacking a ceramic green sheet on which the first internal electrode 121 is printed and a ceramic green sheet on which the second internal electrode 122 is printed, and then performing sintering thereon.

A material, included in the internal electrodes 121 and 122, is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for an internal electrode including at least one of nickel (Ni), copper (Cu), palladium (Pd), silver (Ag), gold (Au), platinum (Pt), tin (Sn), tungsten (W), titanium (Ti), and alloys thereof, on a ceramic green sheet. A screen-printing method or a gravure-printing method may be used as a method for printing the conductive paste for an internal electrode, but the present disclosure is not limited thereto.

A thickness (te) of each of the internal electrodes 121 and 122 is not limited.

In order to achieve high capacitance of a multilayer electronic component, a thickness of each of the internal electrodes 121 and 122 may be 1.0 μm or less. In order to more easily achieve high capacitance and miniaturization of the multilayer electronic component, the thickness of each of the internal electrodes 121 and 122 may be 0.6 μm or less, and more preferably 0.4 μm or less.

The thickness (te) of each of the internal electrodes 121 and 122 may refer to a size of each of the internal electrodes 121 and 122 in the first direction. In addition, the thickness (te) of each of the internal electrodes 121 and 122 may refer to an average thickness (te) of each of the internal electrodes 121 and 122, and may refer to an average size of each of the internal electrodes 121 and 122 in the first direction.

The average size of each of the internal electrodes 121 and 122 in the first direction may be measured by scanning, with an SEM, an image of a cross-section of the body 110 in the first and second directions at a magnification of 10,000. More specifically, an average size of one internal electrode in the first direction may refer to an average value of sizes of the one internal electrode in the first direction, measured at thirty points, equally spaced apart from each other in the second direction, in the scanned image. The thirty equally spaced points may be designated in the capacitance formation portion Ac. In addition, when such average value measurement is performed on ten internal electrode electrodes, the average size of the internal electrode in the first direction may be further generalized.

The body 110 may include cover portions 112 and 113 disposed on both end surfaces of the capacitance formation portion Ac in the first direction.

More specifically, the cover portions 112 and 113 include a first cover portion 112 disposed on one surface of the capacitance formation portion Ac in the first direction, and a second cover portion 113 disposed on the other surface of the capacitance formation portion Ac in the first direction.

Here, the first cover portion 112 may be referred to as an upper cover portion 112 disposed on an upper portion of the capacitance formation portion Ac in the first direction, and the second cover portion 113 may be referred to as a lower cover portion 113 disposed on a lower portion of the capacitance formation portion Ac in the second direction.

The upper cover portion 112 and the lower cover portion 113 may be formed by laminating a single dielectric layer 111 or two or more dielectric layers 111 on upper and lower surfaces of the capacitance formation portion Ac in the first direction, respectively, and may serve to prevent damage to the internal electrodes 121 and 122 caused by physical or chemical stress.

The upper cover portion 112 and the lower cover portion 113 may not include the internal electrodes 121 and 122, and may include a material the same as that of the dielectric layer 111. That is, the upper cover portion 112 and the lower cover portion 113 may include a ceramic material, for example, a barium titanate ($BaTiO_3$)-based ceramic material, and may further include a piezoelectric ceramic material excluding the barium titanate ($BaTiO_3$)-based materials.

That is, in the multilayer electronic component 100 according to an example embodiment of the present disclosure, the upper and lower cover portions 112 and 113 may include the barium titanate ($BaTiO_3$)-based material as a main ingredient, and may include the piezoelectric ceramic material excluding the barium titanate ($BaTiO_3$)-based material as a sub-ingredient.

As described above, with an increase in demand for IT electronic devices having a smaller size and a higher degree of integration, conditions related to acoustic noise in such devices also have become more stringent. As a result, there is a need for products having improved acoustic noise properties.

When MLCCs according to the related art are continuously exposed to acoustic noise, generated when high frequencies are applied, and are operated, MLCCs may have a negative effect on adjacent circuits or devices, or may destabilize electrical signal transmission. In addition, continuous acoustic noise generation may deform an MLCC itself, such that the MLCC may have lowered reliability and durability, which may cause noise issues for users using devices including the MLCC.

To solve such an issue, research into chips having low acoustic noise has been conducted. However, in the present disclosure, a chip having low acoustic noise may not be designed, but vibrations, opposite to vibrations generated by a multilayer electronic component when an alternating voltage is applied, may be generated, which may have an effect of cancelling noise caused by vibrations.

In general, a piezoelectric material may be a material having a property of converting electrical energy into kinetic energy using a piezoelectric effect, or converting kinetic energy into electrical energy using an inverse piezoelectric effect. The piezoelectric effect may be divided into a positive piezoelectric effect and an inverse piezoelectric effect. The positive piezoelectric effect may be an effect in which electric energy is generated when a piezoelectric device is deformed, and the inverse piezoelectric effect may be an effect in which displacement is generated when electric energy is applied to a piezoelectric device. Among the effects, the inverse piezoelectric effect may be applied in various fields, such as piezoelectric sensors, actuators, motors, and the like.

Accordingly, in the present disclosure, electrostrictive stress applied to a multilayer electronic component may be cancelled using the piezoelectric effect or the inverse piezoelectric effect, thereby improving reliability of the component.

The piezoelectric ceramic material described herein may refer to a piezoelectric ceramic material excluding a barium titanate ($BaTiO_3$)-based material.

In addition, in the present disclosure, the "main ingredient" may refer to an ingredient occupying a relatively large atomic percentage compared to other ingredients, and may refer to an ingredient accounting for 50 at % or more with respect to the total number of atoms in the entire composition or entire dielectric layer. The "sub-ingredient" may refer to an ingredient occupying a relatively small atomic percentage compared to other ingredients, and may refer to an ingredient accounting for less than 50 at % with respect to the total number of atoms in the entire composition or entire dielectric layer.

The piezoelectric ceramic material may include at least one of a single crystal, a soft piezoceramic, a hard piezoceramic, and a high-temperature ceramic.

More specifically, the single crystal may include at least one of $0.67Pb(Mg_{1/3}Nb_{2/3})O_3$-$0.33PbTiO_3$ (0.67PMN-0.33PT), $0.71Pb(Mg_{1/3}Nb_{2/3})O3$-$0.29PbTiO_3$ (0.71PMN-0.29PT), $0.93Pb(Zn_{1/3}Nb_{2/3})O_3$-$0.07PbTiO_3$ (0.93PZN-0.07PT), $0.91Pb(Zn_{1/3}Nb_{2/3})O_3$-$0.07PbTiO_3$ (0.91PZN-0.07PT), $0.66Pb(In_{1/2}Nb_{1/2})O_3$-$0.34PbTiO_3$ (0.66PIN-0.34PT), potassium sodium niobate tantalate (KNNT), lithium niobate ($LiNbO_3$), and alpha quartz ($\alpha$-quartz, $SiO_2$)

The piezoelectric ceramic material that is in a single crystal form may maintain a crystal form thereof during the sintering process, and may be in a single crystal form in the cover portions 112 and 113 even after sintering.

A method of verifying whether a single crystal is present or verifying a single crystal material may include, for example, when measurement is performed using X-ray diffraction (XRD), verifying whether a single crystal is present by verifying a structure of a crystal lattice detected through a measured peak, or verifying a specific single crystal material from a detected peak, but the present disclosure is not particularly limited thereto.

The soft piezoceramic may include at least one of lead zirconate titanate-5A (PZT-5A), 2.5% samarium-doped lead magnesium niobate-29lead titanate (2.5Sm-PMN-29PT), textured lead magnesium niobate-lead titanate (textured PMN-PT), lead zirconate titanate-lead zirconate titanate (0.3PZN-0.7PZT), lead niobate-lead zirconate-lead titanate (0.55PNN-0.135PZ-0.315PT), textured potassium sodium niobate tantalate (Textured $(KNL)(NTS)O_3$), bismuth sodium titanate (BNT), and $NaNbO_3$—$BaZrO_3$—$BiLa_4Ti_3O_{12}$ (NKN-BZ-BLT).

The hard piezoceramic may include at least one of potassium sodium niobate-potassium calcium niobate (KNN-KCN), lead zirconate titanate-4 (PZT-4), lead zirconate titanate-8 (PZT-8), lead magnesium manganese niobate-lead zirconate titanate (PMMnN-PZT), lead magnesium manganese niobate-lead zirconate titanate with 0.2% copper oxide (PMMnN-PZT+0.2 wt % CuO), lead strontium niobate-lead nickel niobate-lead zirconate titanate (0.015PSN-0.3PNN-0.685PZT), lead magnesium strontium-niobate-lead zirconate titanate (PMS-PZT), lead magnesium strontium-niobate-lead nickel niobate-lead zirconate titanate (PMS-PNN-PZT), lead niobate-lead magnesium strontium-niobate-lead zirconate titanate (PNW-PMS-PZT), and lead strontium niobate-lead zinc niobate-lead zirconate titanate with manganese (PSN-PZN-PZT-Mn).

The high-temperature ceramic may include at least one of bismuth scandium oxide-lead titanium oxide ($0.36BiScO_3$-$0.64PbTiO_3$), bismuth gallium scandium oxide-lead titanium oxide ($0.4Bi(Ga_{1/4}Sc_{3/4})O_3$-$0.6PbTiO_3$), bismuth scandium oxide-lead titanium oxide with manganese (0.34BS-0.66PT-Mn), bismuth iron scandium oxide-lead titanium oxide ($0.45Bi(Fe_{1/2}Sc_{1/2})O_3$-$0.55PbTiO_3$), bismuth scandium oxide-lead titanium oxide with lithium niobate ($0.98(0.36BiScO_3$-$0.64PbTiO_3)$-$0.02LiNbO_3$), $0.63Bi(Mg_{1/2}Ti_{1/2})O_3$-$0.37PbTiO_3$, bismuth magnesium titanium oxide-lead titanium oxide ($0.46[BiScO_3+Bi(Ni_{1/2}T_{1/2})O_3]$-$0.54PbTiO_3$), and bismuth scandium oxide-bismuth nickel titanium oxide-lead titanium oxide ($0.35BiScO_3$-$0.25Bi(Zr_{0.5}Zn_{0.5})O_3$-$0.625PbTiO_3$)

In an example embodiment of the present disclosure, the cover portions 112 and 113 may include a plurality of dielectric grains, such that the plurality of dielectric grains may include a first dielectric grain 10 including a barium titanate ($BaTiO_3$)-based material, and a second dielectric grain 20 including the above-described piezoelectric ceramic material.

The cover portions 112 and 113 may include the second dielectric grain 20 including the piezoelectric ceramic material, such that the piezoelectric effect or the inverse piezoelectric effect may be effectively implemented, and acoustic noise applied to the multilayer electronic component 100 may be cancelled to reduce electrostrictive stress, thereby improving reliability and a lifespan of the multilayer electronic component 100.

A method of measuring a dielectric grain may include, for example, measuring a cross-section of a cover portion in the first and second directions or a cross-section of the cover portion in the first and third directions using an SEM or a transmission electron microscope (TEM). In an energy dispersive X-ray spectroscopy (EDS) mode, a dielectric grain, including barium (Ba), titanium (Ti), and oxygen (O) elements, may be interpreted as the first dielectric grain 10, and a dielectric grain, including an element included in the piezoelectric ceramic material, may be interpreted as the second dielectric grain 20.

In addition, a dielectric constant, a dielectric loss, a frequency property, and the like, of the cover portions 112 and 113, measured using equipment, such as an LCR meter, an impedance analyzer, a d33 meter, or the like, when the cover portions 112 and 113 include the second dielectric grain 20 may be different from those of the cover portions 112 and 113 measured when the cover portions 112 and 113 include only the first dielectric grain 10, or a piezoelectric property and the like of the cover portions 112 and 113 may be improved depending on a product. Whether the second dielectric grain 20 is included may be measured using such piezoelectric material measuring equipment, but the present disclosure is not particularly limited thereto.

In the multilayer electronic component 100 according to an example embodiment of the present disclosure, the number of first dielectric grains 10 included in the cover portions 112 and 113 is A, and the number of second dielectric grains 20 included in the cover portions 112 and 113 is B, the cover portions 112 and 113 may satisfy $B \le A$. That is, among a plurality of dielectric grains included in the cover portions 112 and 113, the first dielectric grains 10 may be more than the second dielectric grains 20. Here, the cover portions 112 and 113 satisfying B A may mean that the upper cover portion 112 satisfies B A or the lower cover portion 113 satisfies B A. Alternatively, the cover portions 112 and 113 satisfying B A may mean that the upper and lower cover portions 112 and 113 satisfy B A.

For example, referring to FIGS. 2 and 4, with respect to a cross-section of the above-described cover portion, the number of first dielectric grains 10 included in a region of 10 μm×10 μm may be defined as A, and the number of second dielectric grains 20 included in the region of 10 μm×10 μm may be defined as B, which may mean that the region of 10 μm×10 μm of the cross section of the cover portion may satisfy B A, but the present disclosure is not particularly limited thereto.

The number (A) of first dielectric grains and the number (B) of second dielectric grains, included in the cover portions 112 and 113, may satisfy B A, thereby effectively reducing electrostrictive stress caused by acoustic noise applied to the cover portions 112 and 113, maintaining strength of the cover portions 112 and 113, and sufficiently protecting the internal electrodes 121 and 122.

The number (A) of first dielectric grains and the number (B) of second dielectric grains, included in the cover portions 112 and 113, may satisfy $A<B$, electrostrictive stress, caused by acoustic noise applied to the cover portions 112 and 113, may be more efficiently reduced. However, the cover portions 112 and 113 may have reduced strength, resulting in insufficient protection of the internal electrodes 121 and 122.

Alternatively, in the multilayer electronic component 100 according to an example embodiment of the present disclosure, the number of first dielectric grains 10, among a plurality of dielectric grains included in the cover portions 112 and 113, may have a percentage of 50% or more, or the number of second dielectric grains 20, among the plurality of dielectric grains included in the cover portions 112 and 113, may have a percentage of 50% or less. Here, the number of first dielectric grains 10, among the plurality of dielectric grains included in the cover portions 112 and 113, having a percentage of 50% or more, or the number of second dielectric grains 20, among the plurality of dielectric grains included in the cover portions 112 and 113, having a percentage of 50% or less may mean that the number of first dielectric grains 10, among a plurality of dielectric grains included in at least one of the upper cover portion 112 or the lower cover portion 113, may have a percentage of 50% or more, or that the number of second dielectric grains 20, among the plurality of dielectric grains included in the cover portions 112 and 113, may have a percentage of 50% or less. For example, with respect to a cross-section of the above-described cover portion, the number of first dielectric grains 10, among a plurality of dielectric grains included in a region of 10 μm×10 μm, may have a percentage of 50% or more, or the number of second dielectric grains 20, among the plurality of dielectric grains, may have a percentage of 50% or less, but the present disclosure is not particularly limited thereto.

The number of first dielectric grains, among the plurality of dielectric grains included in the cover portions 112 and 113, may have a percentage of 50% or more, or the number of second dielectric grains, among the plurality of dielectric grains included in the cover portions 112 and 113, may have a percentage of 50% or less, thereby effectively reducing electrostrictive stress caused by acoustic noise applied to the cover portions 112 and 113, maintaining strength of the cover portions 112 and 113, and sufficiently protecting the internal electrodes 121 and 122.

When the number of first dielectric grains, among the plurality of dielectric grains included in the cover portions 112 and 113, has a percentage less than 50%, or when the number of second dielectric grains, among the plurality of dielectric grains included in the cover portions 112 and 113, has a percentage greater than 50%, electrostrictive stress, caused by acoustic noise applied to the cover portions 112 and 113, may be more efficiently reduced. However, the cover portions 112 and 113 may have reduced strength, resulting in insufficient protection of the internal electrodes 121 and 122.

A thickness (tc) of each of the cover portions 112 and 113 is not limited.

In order to more easily achieve high capacitance and miniaturization of a multilayer electronic component, the thickness (tc) of each of the cover portions 112 and 113 may be 100 μm or less, preferably 30 μm or less, and more preferably 20 μm or less in an ultra-small product.

The thickness (tc) of each of the cover portions 112 and 113 may refer to a size of each of the cover portions 112 and 113 in the first direction. In addition, the thickness (tc) of each of the cover portions 112 and 113 may refer to an average thickness (tc) of each of the cover portions 112 and 113, and may refer to an average size of each of the cover portions 112 and 113 in the first direction.

The average size of each of the cover portions 112 and 113 in the first direction may be measured by scanning, with an SEM, an image of a cross-section of the body 110 in the first and second directions at a magnification of 10,000. More specifically, an average size of one cover portion in the first direction may refer to an average value of sizes of the one cover portion in the first direction, measured at thirty points, equally spaced apart from each other in the second direction, in the scanned image.

In addition, an average size of a cover portion in the first direction, measured using the above-described method, may be substantially the same as an average size of a cover portion in the first direction in a cross-section of the body 110 in the first and third directions.

The multilayer electronic component 100 may include side margin portions 114 and 115 disposed on both end surfaces of the body 110 in the third direction.

More specifically, the side margin portions 114 and 115 include a first side margin portion 114 disposed on a fifth surface 5 of the body 110, and a second side margin portion 115 disposed on a sixth surface 6 of the body 110.

As illustrated, the side margin portions 114 and 115 may refer to regions between both end surfaces of the first and second internal electrodes 121 and 122 and a boundary surface of the body 110, with respect to the cross-section of the body 110 in the first and third directions.

The internal electrodes 121 and 122 may be formed by applying a conductive paste onto a ceramic green sheet applied to the capacitance formation portion Ac, excluding a portion in which the side margin portions 114 and 115 are to be formed. In order to suppress a step caused by the internal electrodes 121 and 122, the internal electrodes 121 and 122 may be stacked and cut to be exposed through the fifth and sixth surfaces 5 and 6 of the body 110, and then a single dielectric layer 111 or two or more dielectric layers 111 may be stacked on both end surfaces of the capacitance formation portion Ac in the third direction to form the side margin portions 114 and 115.

The side margin portions 114 and 115 may basically serve to prevent damage to the internal electrodes 121 and 122 caused by physical or chemical stress.

The first side margin portion 114 and the second side margin portion 115 may not include the internal electrodes 121 and 122, and may include a material the same as that of the dielectric layer 111. That is, the first side margin portion 114 and the second side margin portion 115 may include a ceramic material, for example, a barium titanate ($BaTiO_3$)-based ceramic material, and may further include a piezoelectric ceramic material excluding the barium titanate ($BaTiO_3$)-based material.

That is, in the multilayer electronic component 100 according to an example embodiment of the present disclosure, the first and second side margin portions 114 and 115 may include the barium titanate ($BaTiO_3$)-based material as a main ingredient, and the piezoelectric ceramic material excluding the barium titanate ($BaTiO_3$)-based material as a sub-ingredient.

Hereinafter, a description of the piezoelectric ceramic material related to the side margin portions 114 and 115 may be the same as a description of the piezoelectric ceramic material related to the cover portions 112 and 113, and a repeated description may be omitted.

However, the side margin portions 114 and 115 may not need to include a piezoelectric ceramic material, the same as the piezoelectric ceramic material included in the cover portions 112 and 113, and may include a piezoelectric ceramic material, different from the piezoelectric ceramic material included in the cover portions 112 and 113. When the side margin portions 114 and 115 include a plurality of piezoelectric ceramic materials, the plurality of piezoelectric ceramic materials may be different from the piezoelectric ceramic material included in the cover portions 112 and 113, or at least one of the plurality of piezoelectric ceramic materials may be the same as the piezoelectric ceramic material, included in the cover portions 112 and 113.

That is, the piezoelectric ceramic material, included in the cover portions 112 and 113, may be defined as a first piezoelectric ceramic material, and the piezoelectric ceramic material, included in the side margin portions 114 and 115, may be defined as a second piezoelectric ceramic material. The first and second piezoelectric ceramic materials may be the same as or different from each other, or may include partially the same piezoelectric ceramic material.

The piezoelectric ceramic material, included in the side margin portions 114 and 115, may be the same as the piezoelectric ceramic material, included in the cover portions 112 and 113, and may include at least one of a single crystal, a soft piezoceramic, a hard piezoceramic, and a high-temperature ceramic.

In an example embodiment of the present disclosure, the side margin portions 114 and 115 may include a plurality of dielectric grains, and the plurality of dielectric grains include a first dielectric grain including a barium titanate ($BaTiO_3$)-based material, and a second dielectric grain including the above-described piezoelectric ceramic material.

The side margin portions 114 and 115 may include the second dielectric grain 20 including the piezoelectric ceramic material, such that the piezoelectric effect or the inverse piezoelectric effect may be effectively implemented, and acoustic noise applied to the multilayer electronic component 100 may be cancelled to reduce electrostrictive stress, thereby improving reliability and a lifespan of the multilayer electronic component 100.

A method of measuring a dielectric grain may include, for example, measuring a cross-section of a multilayer electronic component including a side margin portion in the first and third directions using an SEM or a TEM. In an EDS mode, a dielectric grain, including barium (Ba), titanium (Ti), and oxygen (O) elements, may be interpreted as a first dielectric grain, and a dielectric grain, including an element included in a piezoelectric ceramic material, may be interpreted as a second dielectric grain.

In the multilayer electronic component 100 according to an example embodiment of the present disclosure, when the number of first dielectric grains included in the side margin portions 114 and 115 is A and the number of second dielectric grains included in the side margin portions 114 and 115 is B, the side margin portions 114 and 115 may satisfy B A. That is, among a plurality of dielectric grains included in the side margin portions 114 and 115, the first dielectric grains may be more than the second dielectric grains.

Here, the number of first dielectric grains, included in the side margin portions 114 and 115, may be defined as A and the number of second dielectric grains, included in the side margin portions 114 and 115, may be defined as B. However, the number (A) of first dielectric grains and the number (B) of second dielectric grains, included in the side margin portions 114 and 115, may be different from the number (A) of first dielectric grains and the number (B) of second dielectric grains, included in the cover portions 112 and 113, and a person skilled in the art would be able to understand a description of a cover portion and a description of a side margin portion separately.

For example, with respect to a cross-section of the above-described side margin portion, the number of first dielectric grains 10 included in a region of 10 μm×10 μm may be defined as A, and the number of second dielectric grains 20 included in the region of 10 μm×10 μm may be defined as B, which may mean that the region of 10 μm×10 μm of the cross section of the cover portion may satisfy B A, but the present disclosure is not particularly limited thereto.

The number (A) of first dielectric grains and the number (B) of second dielectric grains, included in the side margin portions 114 and 115, may satisfy B A, thereby effectively reducing electrostrictive stress caused by acoustic noise applied to the side margin portions 114 and 115, maintaining strength of the side margin portions 114 and 115, and sufficiently protecting the internal electrodes 121 and 122.

When the number (A) of first dielectric grains and the number (B) of second dielectric grains, included in the side margin portions 114 and 115, satisfy A<B, electrostrictive stress, caused by acoustic noise applied to the side margin portions 114 and 115, may be more efficiently reduced. However, the side margin portions 114 and 115 may have reduced strength, resulting in insufficient protection of the internal electrodes 121 and 122.

Alternatively, in the multilayer electronic component 100 according to an example embodiment of the present disclosure, the number of first dielectric grains, among the plurality of dielectric grains included in the side margin portions 114 and 115, may be a percentage of 50% or more, or the number of second dielectric grains, among the plurality of dielectric grains included in the side margin portions 114 and 115, may have a percentage of 50% or less.

For example, with respect to a cross-section of the above-described side margin portion, the number of first dielectric grains 10, among a plurality of dielectric grains included in a region of 10 μm×10 μm, may have a percentage of 50% or more, or the number of second dielectric grains 20, among the plurality of dielectric grains, may have a percentage of 50% or less, but the present disclosure is not particularly limited thereto.

The number of first dielectric grains, among the plurality of dielectric grains included in the side margin portions 114 and 115, may have a percentage of 50% or more, or the number of second dielectric grains, among the plurality of dielectric grains included in the side margin portions 114 and 115, may have a percentage of 50% or less, thereby effectively reducing electrostrictive stress caused by acoustic noise applied to the side margin portions 114 and 115, maintaining strength of the side margin portions 114 and 115, and sufficiently protecting the internal electrodes 121 and 122.

When the number of first dielectric grains, among the plurality of dielectric grains included in the side margin portions 114 and 115, has a percentage less than 50%, or when the number of second dielectric grains, among the plurality of dielectric grains included in the side margin portions 114 and 115, has a percentage greater than 50%, electrostrictive stress, caused by acoustic noise applied to the side margin portions 114 and 115, may be more efficiently reduced. However, the side margin portions 114 and 115 may have reduced strength, resulting in insufficient protection of the internal electrodes 121 and 122.

A width (wm) of each of the first and second side margin portions 114 and 115 is not limited.

In order to more easily achieve high capacitance and miniaturization of the multilayer electronic component 100, the width (wm) of each of the side margin portions 114 and 115 may be 100 μm or less, preferably 30 μm or less, and more preferably 20 μm or less in an ultra-small product.

The width (wm) of each of the side margin portions 114 and 115 may refer to a size of each of the side margin portions 114 and 115 in the third direction. In addition, the width (wm) of each of the side margin portions 114 and 115 may refer to an average width (wm) of each of the side margin portions 114 and 115, and may refer to an average size of each of the side margin portions 114 and 115 in the third direction.

The average size of each of the side margin portions 114 and 115 in the third direction may be measured by scanning, with an SEM, an image of a cross-section of the body 110 in the first and third directions at a magnification of 10,000. More specifically, an average size of one side margin portion in the third direction may refer to an average value of sizes of the one side margin portion in the third direction, measured at ten points, equally spaced apart from each other in the first direction, in the scanned image.

In an example embodiment of the present disclosure, a structure in which a ceramic electronic component 100 has two external electrodes 131 and 132 is described, but the number, shape, and the like of the external electrodes 131 and 132 may vary depending on a form of the internal electrodes 121 and 122 or other purposes.

The external electrodes 131 and 132 may be disposed on the body 110 to be connected to the internal electrodes 121 and 122.

More specifically, the external electrodes 131 and 132 may include first and second external electrodes 131 and 132 respectively disposed on the third and fourth surfaces 3 and 4 of the body 110, the first and second external electrodes 131 and 132 respectively connected to the first and second internal electrodes 121 and 122. That is, the first external electrode 131 may be disposed on the third surface 3 of the body 110 to be connected to the first internal electrode 121, and the second external electrode 132 may be disposed on the fourth surface 4 of the body 110 to be connected to the second internal electrode 122.

In addition, the external electrodes 131 and 132 may be disposed on a portion of the first and second surfaces 1 and 2 of the body 110 to extend, or may be disposed on a portion of the fifth and sixth surfaces 5 and 6 of the body 110 to extend. That is, the first external electrode 131 may be disposed on a portion of the first, second, fifth, and sixth surfaces 1, 2, 5, and 6 of the body 110, and the third surface 3 of the body 110, and the second external electrode 132 may be disposed on a portion of the first, second, fifth, and sixth surfaces 1, 2, 5, and 6 of the body 110, and the third surface 3 of the body 110.

The external electrodes 131 and 132 may be formed of any material having electrical conductivity, such as a metal or the like, and a specific material may be determined in consideration of electrical properties, structural stability, and the like. Furthermore, the external electrodes 131 and 132 may have a multilayer structure.

For example, the external electrodes 131 and 132 may include an electrode layer disposed on the body 110, and plating layers 131*c* and 132*c* disposed on the electrode layer.

For a more specific example of the electrode layer, the electrode layer may include first electrode layers 131*a* and 132*a*, sintered electrodes including a first conductive metal and glass, or second electrode layers 131*b* and 132*b*, resin-based electrodes including a second conductive metal and a resin.

Here, the first conductive metal may refer to a conductive metal included in the first electrode layers 131*a* and 132*a*, and the second conductive metal may refer to a conductive metal included in the second electrode layers 131*b* and 132*b*. In this case, the first conductive metal and the second conductive metal may be the same or different from each other, and may include the same metal material, but the present disclosure is not particularly limited thereto.

In addition, the electrode layer may have a form in which the sintered electrode and the resin-based electrode are sequentially formed on a body.

In addition, the electrode layer may be formed by transferring a sheet including a conductive metal onto the body or transferring the sheet including the conductive metal onto the sintered electrode.

A material having excellent electrical conductivity may be used as a conductive metal included in the electrode layers 131*a*, 132*a*, 131*b*, and 132*b*. For example, the conductive metal may be at least one selected from the group consisting of nickel (Ni), copper (Cu), palladium (Pd), silver (Ag), gold (Au), platinum (Pt), tin (Sn), tungsten (W), titanium (Ti), and alloys thereof, but the present disclosure is not particularly limited thereto.

In an example embodiment of the present disclosure, the electrode layers 131*a*, 132*a*, 131*b*, and 132*b* may have a two-layer structure including the first electrode layers 131*a* and 132*a* and the second electrode layers 131*b* and 132*b*. Accordingly, the external electrodes 131 and 132 may include first electrode layers 131*a* and 132*a* including a conductive metal and glass, and second electrode layers 131*b* and 132*b* disposed on the first electrode layers 131*a* and 132*a* and including a conductive metal and resin.

The first electrode layers 131*a* and 132*a* including glass may serve to improve adhesion to the body 110, and the second electrode layers 131*b* and 132*b* including a resin may serve to improve bending strength.

The conductive metal used for the electrode layer is not particularly limited as long as it is a material capable of being electrically connected to the internal electrodes 121 and 122 to form capacitance. For example, the conductive metal may include at least one selected from the group consisting of nickel (Ni), copper (Cu), palladium (Pd), silver (Ag), gold (Au), platinum (Pt), tin (Sn), tungsten (W), titanium (Ti), and alloys thereof. The first electrode layers 131*a* and 132*a* may be formed by applying a conductive paste prepared by adding a glass frit to conductive metal powder and then performing sintering thereon.

The conductive metal included in the second electrode layers 131*b* and 132*b* may serve to allow electrical connection to the first electrode layers 131*a* and 132*a*.

The conductive metal included in the second electrode layers 131*b* and 132*b* is not particularly limited as it is a material capable of being electrically connected to the electrode layers 131*a* and 132*a*, and the conductive metal may include at least one selected from the group consisting of nickel (Ni), copper (Cu), palladium (Pd), silver (Ag), gold (Au), platinum (Pt), tin (Sn), tungsten (W), titanium (Ti), and alloys thereof.

The conductive metal included in the second electrode layers 131*b* and 132*b* may include at least one of spherical particles and flake-type particles. That is, the conductive metal may be formed of only flake-type particles, or may be formed of only spherical particles, or may be a mixture of flake-type particles and spherical particles. Here, the spherical particles may have a shape that is not completely spherical, for example, a shape in which a length ratio (long axis/short axis) between a long axis and a short axis is 1.45 or less. The flake-type particles may refer to particles having a flat and elongated shape, and the present disclosure is not particularly limited thereto. For example, the flake-type particles may have a shape in which a length ratio (long axis/short axis) between a long axis and a short axis may be 1.95 or more. Lengths of the long axis and the short axis of each of the spherical particles and the flake-type particles may be measured from an image obtained by scanning, with an SEM, a cross-section in the first and second directions of a central portion of a ceramic electronic component in the third direction.

The resin included in the second electrode layers 131*b* and 132*b* may serve to ensure adhesive properties and absorb impact. The resin included in the second electrode layers 131*b* and 132*b* is not particularly limited as long as it is a material having adhesive properties and impact absorption properties while being mixed with conductive metal powder particles to form a paste. The resin may include, for example, an epoxy-based resin.

In addition, the second electrode layers 131*b* and 132*b* may include a plurality of metal particles, an intermetallic compound, and a resin. As the intermetallic compound is included therein, the second electrode layers 131*b* and 132*b* may further improve electrical connectivity with the first electrode layers 131*a* and 132*a*. The intermetallic compound may connect the plurality of metal particles to each other to improve electrical connectivity, and may surround the plurality of metal particles to connect the plurality of metal particles to each other.

In this case, the intermetallic compound may include a metal having a melting point lower than a curing temperature of the resin. That is, due to the intermetallic compound including the metal having the melting point lower than the curing temperature of the resin, the metal having the melting point lower than the curing temperature of the resin may be molten during a drying and curing process, and may form the intermetallic compound with a portion of the metal particles to surround the metal particles. In this case, the intermetallic compound may preferably include a metal having a low melting point of 300° C. or less.

For example, the intermetallic compound may include Sn having a melting point of 213 to 220° C. During the drying and curing process, Sn may be molten, and the molten Sn may allow metal particles having a high melting point, such as Ag, Ni, or Cu, to be wetted by a capillary phenomenon, and the molten Sn may react with a portion of Ag, Ni, or Cu metal particles to form an intermetallic compound such as $Ag_3Sn$, $Ni_3Sn_4$, $Cu_6Sn_5$, $Cu_3Sn$, or the like. Ag, Ni, or Cu, not reacting with the molten Sn, may remain in the form of metal particles.

Accordingly, the plurality of metal particles may include one or more of Ag, Ni, and Cu, and the intermetallic compound may include one or more of $Ag_3Sn$, $Ni_3Sn_4$, $Cu_6Sn_5$, and $Cu_3Sn$.

The plating layers 131*c* and 132*c* serve to improve mounting properties.

A type of the plating layers 131*c* and 132*c* is not particularly limited, and may be a single plating layer including at least one of nickel (Ni), tin (Sn), palladium (Pd), and alloys thereof, and may be a plurality of plating layers including each plating layer including at least one of nickel (Ni), tin (Sn), palladium (Pd), and alloys thereof.

For more specific example, the plating layers 131*c* and 132*c* may be Ni plating layers or Sn plating layers, and may have a form in which a Ni plating layer and a Sn plating layer are sequentially formed on the electrode layers 131*a*, 132*a*, 131*b*, and 132*b*, and may have a form in which a Sn plating layer, a Ni plating layer and a Sn plating layer are sequentially formed on the electrode layers 131*a*, 132*a*, 131*b*, and 132*b*. In addition, the plating layers 131*c* and 132*c* may include a plurality of Ni plating layers and/or a plurality of Sn plating layers.

A size of the multilayer electronic component 100 is not particularly limited.

However, in order to simultaneously achieve miniaturization and high capacitance, a dielectric layer and an internal electrode may need to have a reduced thickness to increase the number of laminations. Thus, the multilayer electronic component 100 having a size of 3216 (length×width: 3.2 mm×1.6 mm) or less may have a more significant effect according to the present disclosure.

While example embodiments have been shown and described above, it will be apparent to those skilled in the art that modifications and variations could be made without departing from the scope of the present disclosure as defined by the appended claims.

In addition, the term "an example embodiment" does not refer to the same example embodiment, and describe different unique features of various example embodiments. However, the above-suggested example embodiments may also be implemented to be combined with a feature of another example embodiment. For example, even when a content described with respect to an example embodiment is not described in another example embodiment, it may be understood as a description related to the other example embodiment unless described to the contrary or contradictory in the other example embodiment.

The terms used herein are merely used to describe a specific example embodiment, and are not intended to limit the present disclosure. Singular forms may include plural forms as well unless the context clearly indicates otherwise.

What is claimed is:

1. A multilayer electronic component comprising:

a body including a capacitance formation portion including a dielectric layer and an internal electrode alternately disposed with the dielectric layer in a first direction, and a cover portion disposed on both end surfaces of the capacitance formation portion in the first direction; and an external electrode disposed on the body, wherein the cover portion includes a barium titanate ($BaTiO_3$)-based material as a main ingredient, and a piezoelectric ceramic material excluding the barium titanate ($BaTiO_3$)-based material as a sub-ingredient.

2. The multilayer electronic component of claim 1, wherein the cover portion includes a plurality of dielectric grains, and the plurality of dielectric grains, included in the cover portion, include first dielectric grains including the barium titanate ($BaTiO_3$)-based material, and second dielectric grains including the piezoelectric ceramic material.

3. The multilayer electronic component of claim 2, wherein, when a number of the first dielectric grains, included in the cover portion, is A and a number of the second dielectric grains, included in the cover portion, is B, $B \leq A$ is satisfied.

4. The multilayer electronic component of claim 2, wherein a number of the first dielectric grains, among the plurality of dielectric grains included in the cover portion, has a percentage of 50% or more.

5. The multilayer electronic component of claim 2, wherein a number of the second dielectric grains, among the plurality of dielectric grains included in the cover portion, has a percentage of 50% or less.

6. The multilayer electronic component of claim 1, wherein the piezoelectric ceramic material includes at least one of a single crystal, a soft piezoceramic, a hard piezoceramic, and a high-temperature ceramic.

7. The multilayer electronic component of claim 6, wherein the single crystal includes at least one of 0.67PMN-0.33PT, 0.71PMN-0.29PT, 0.93PZN-0.07PT, 0.91PZN-0.07PT, 0.66PIN-0.34PT, KNNT, $LiNbO_3$, and α-quartz.

8. The multilayer electronic component of claim 6, wherein the soft piezoceramic includes at least one of PZT-5A, 2.5Sm-PMN-29PT, textured PMN-PT, 0.3PZN-0.7PZT, 0.55PNN-0.135PZ-0.315PT, textured (KNL)(NTS)$O_3$, BNT, and NKN-BZ-BLT.

9. The multilayer electronic component of claim 6, wherein the hard piezoceramic includes at least one of KNN-KCN, PZT-4, PZT-8, PMMnN-PZT, PMMnN-PZT+0.2 wt % CuO, 0.015PSN-0.3PNN-0.685PZT, PMS-PZT, PMS-PNN-PZT, PNW-PMS-PZT, and PSN-PZN-PZT-Mn.

10. The multilayer electronic component of claim 6, wherein the high-temperature ceramic includes at least one of $0.36BiScO_3$-$0.64PbTiO_3$, $0.4Bi(Ga_{1/4}Sc_{3/4})O_3$-$0.6PbTiO_3$, 0.34BS-0.66PT-Mn, $0.45Bi(Fe_{1/2}Sc_{1/2})O_3$-$0.55PbTiO_3$, $0.98(0.36BiScO_3$-$0.64PbTiO_3)$-$0.02LiNbO_3$, $0.63Bi(Mg_{1/2}Ti_{1/2})O_3$-$0.37PbTiO_3$, $0.46\ [BiScO_3+Bi(Ni_{1/2}Ti_{1/2})O_3]$-$0.54PbTiO_3$, and $0.35BiScO_3$-$0.25Bi(Zr_{0.5}Zn_{0.5})O_3$-$0.625PbTiO_3$.

11. The multilayer electronic component of claim 1, wherein a region of the capacitance formation portion that is within 10 μm of an interface between the capacitance formation portion and the cover portion toward a central portion of the capacitance formation portion includes the piezoelectric ceramic material.

12. The multilayer electronic component of claim 1, wherein a region of the capacitance formation portion that is not within 10 μm of an interface between the capacitance formation portion and the cover portion toward a central portion of the capacitance formation portion does not include the piezoelectric ceramic material.

13. The multilayer electronic component of claim 1, wherein the capacitance formation portion does not include the piezoelectric ceramic material.

14. The multilayer electronic component of claim 1, wherein the cover portion includes a first cover portion disposed on one surface of the capacitance formation portion in the first direction, and a second cover portion disposed on another surface of the capacitance formation portion in the first direction, and an average size of each of the first and second cover portions in the first direction is 100 μm or less.

15. The multilayer electronic component of claim 1, wherein the body has first and second surfaces opposing each other in the first direction, third and fourth surfaces connected to the first and second surfaces, the third and fourth surfaces opposing each other in a second direction, and fifth and sixth surfaces connected to the first to fourth surfaces, the fifth and sixth surfaces opposing each other in a third direction, the body includes a side margin portion disposed on the fifth and sixth surfaces, and the side margin portion includes the barium titanate ($BaTiO_3$)-based material as a main ingredient, and the piezoelectric ceramic material as a sub-ingredient.

16. The multilayer electronic component of claim 1, wherein the dielectric layer includes $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, and $Ba(Ti_{1-y}Zr_y)O_3$ $(0<y<1)$.

17. The multilayer electronic component of claim 1, wherein the barium titanate ($BaTiO_3$)-based material of the cover portion includes at least one of $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, and $Ba(Ti_{1-y}Zr_y)O_3$ $(0<y<1)$.

18. A multilayer electronic component, comprising:

a capacitance forming portion having dielectric layers and internal electrodes disposed alternately with the dielectric layers; and a cover portion disposed over the capacitance forming portion and comprising a plurality of first grains of a barium titanate-based material and a plurality of second grains of a piezoelectric ceramic material excluding barium titanate.

19. The multilayer electronic component of claim 18, wherein a material of the dielectric layers and the barium titanate-based material are selected from the group consisting of $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, and $Ba(Ti_{1-y}Zr_y)O_3$ $(0<y<1)$, and a combination thereof.

20. The multilayer electronic component of claim 18, wherein a number of second dielectric grains is greater than a number of first dielectric grains.

* * * * *